Patented Oct. 25, 1932

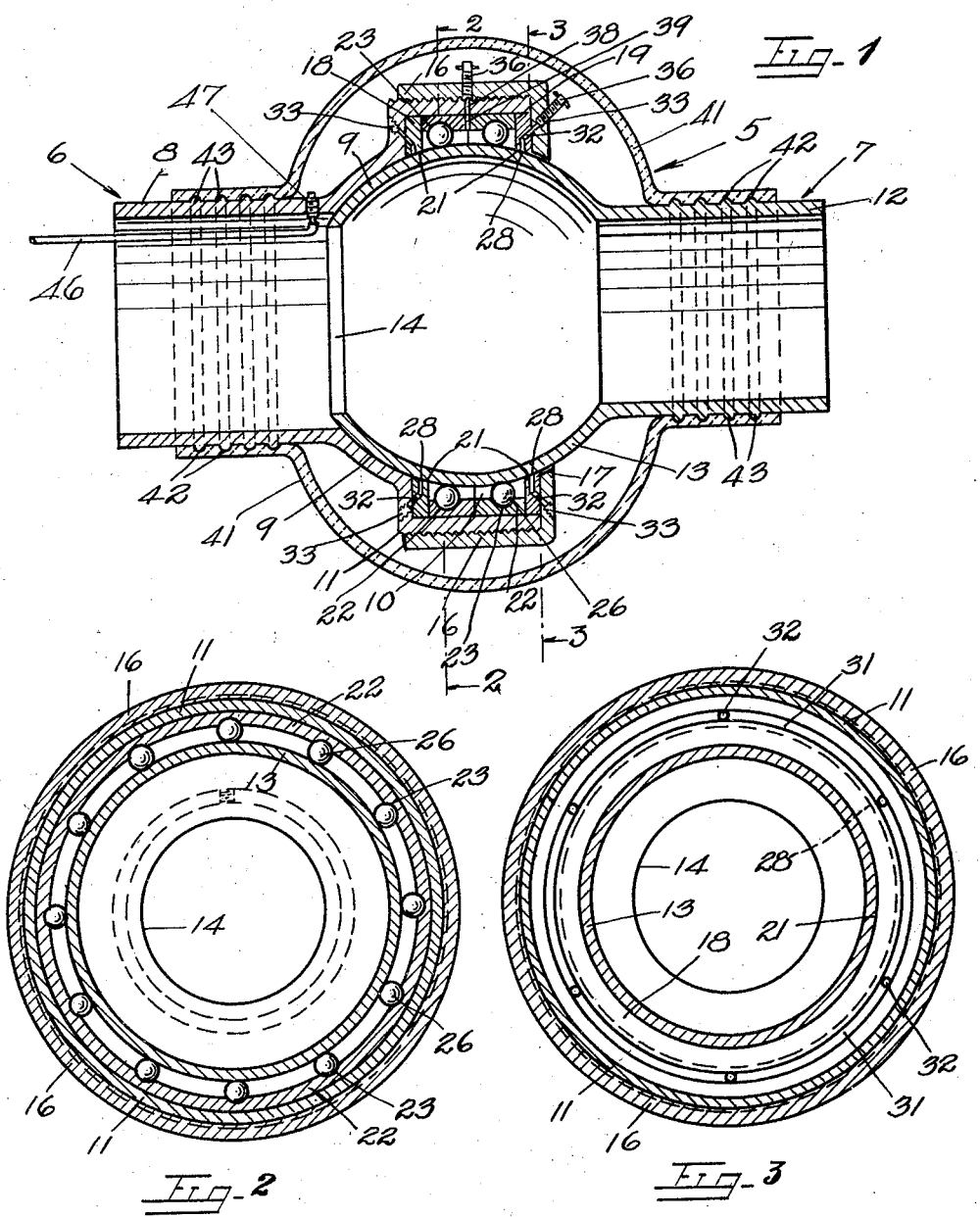

1,884,944

UNITED STATES PATENT OFFICE

JOHN C. WILLIAMS, OF OAKLAND, CALIFORNIA, ASSIGNOR TO HAROLD H. MEREDITH, OF OAKLAND, CALIFORNIA

FLEXIBLE JOINT

Application filed September 11, 1929. Serial No. 391,810.

The invention forming the subject matter of the application relates to flexible joints and more particularly to universal or ball and socket type of joint.

An object of the invention is to provide a flexible joint of such a construction that a tight leak proof connection capable of withstanding high pressures will be maintained without the use of gaskets or other packing between the coacting sections.

Another object of the invention is to provide a flexible joint wherein the joint sections are free to rotate and oscillate independently of each other and wherein means are included for insuring a smooth and efficient movement of the joint sections with respect to each other.

Another object of the invention is to provide a flexible joint which is highly useful and simple in construction. Convenience of arrangement, lightness and comparative inexpense of manufacture are further objects which have been borne in mind in the production and development of the invention.

With the foregoing objects and other objects in view, which will be made manifest in the following detailed description and specifically pointed out in the appended claims, reference is had to accompanying drawing for the illustrative embodiment of the invention, wherein:

Fig. 1 is a longitudinal sectional view of the flexible joint forming the invention.

Fig. 2 is a transverse sectional view taken on the line 2—2 of Fig. 1.

Fig. 3 is a transverse sectional view taken on the line 3—3 of Fig. 1.

Referring to the accompanying drawing wherein similar reference characters designate similar parts thruout, the various figures described above adequately illustrate my invention, and the following detailed description is commensurate with the above mentioned drawing in enabling an artisan to construct and assemble the constituent parts of the same.

In carrying out my invention I make use of a flexible coupling designated as an entirety by the reference numeral 5 and consisting of two coacting sections 6 and 7. The section 6 comprises a tube 8, having a substantially spherical seat or socket 9 formed at one end thereof which spherical seat terminates in an exteriorly threaded annular flange 11 formed on the end of said pipe and defining an annular interior chamber 10. The coacting section 7 comprises a tube 12, similar to the tube 8 and provided with a hollow ball 13 at one end thereof, said ball having a central circular opening 14 in the end thereof, the diameter of said opening being equal to the interior diameter of the tube 12. The ball 13 is adapted to enter the chamber 10 formed by the flange 11 and engage against the seat 9. It will be observed that the diameter of the seat 9 and the outside diameter of the ball 13 are substantially equal. Threaded on the exteriorly threaded flange 11 is a cap 16 provided with a beveled opening 17 thru which extends a portion of the ball 13 as clearly shown in Fig. 1.

Removably fitted within the flange chamber 10 are two sealing rings 18 and 19 which are positioned so as to rest against the respective shoulders of the flange 11 and the cap 16. Formed on the inner periphery of the rings 18 and 19 are beveled faces 21 which tightly fit against the outer surface of the ball 13. Disposed between the rings 18 and 19 and fitted within the chamber 10 are two similar bearing rings 22, each of which is formed with a plurality of equally spaced apart ball bearings sockets 23 on the inner periphery thereof. Mounted in the sockets 23 of each of the rings 22 are a plurality of ball bearings 26 which engage with and ride upon the outer surface of the ball 13. It will be clearly seen viewing Fig. 1, that the position of the flange chamber 12 is such that the center between the ends of said chamber is in alignment with the center of the ball 13 when the same is seated on the spherical seat 9. In this manner each set of the ball bearings 26 will be equally spaced from the center of the ball 13 and on opposite sides of said center and likewise the rings 18 and 19 will be equally spaced from the center of said ball thereby forming a symmetrical construction.

Each of the rings 18 and 19 has formed in the beveled faces 21 thereof an annular groove 28. Another annular groove 31 is also formed on the outer side surfaces of each of the rings 18 and 19 and said annular groove communicates with the annular groove 28 by means of a plurality of passages 32 which are equally spaced apart in the groove 31 and communicate with the groove 28, at the inner ends thereof. Lubricant under pressure is forced into the groove 28 in the rings 18 and 19 thru passages 33 formed in the respective shoulders of the flange 11 and the cap 16, which passages extend thru said shoulders and register at their inner ends with the annular grooves 31 in the rings 18 and 19. There may be one or more of the passages 33 and it is preferable that each of said passages be interiorly threaded at its outer end so as to receive a threaded lubricant fitting as indicated at 36. The fitting 36 may be of any suitable type such as an alemite fitting. It will now be seen that lubricant under pressure in the annular ring grooves 28 will positively seal the joint between the sealing rings 18 and 19 and the ball 13 and absolutely prevent leakage thru the joint formed by said sealing rings and ball.

In order to provide a further seal against leakage a passage 38 is provided, which passage extends thru the annular walls of the flange 11 and the cap 16 and communicates with a registering passage 39 formed between the bearing rings 22 and communicating at its inner end with the chamber 12 at the outer end thereof. The passage 38 is interiorly threaded so as to receive one of the threaded lubricant fittings 36. A lubricant is forced thru the passages 38 and 39 into the chamber 10 until the pressure of the lubricant in said chamber is sufficient to overcome any interior or exterior pressure to which the joint 5 may be subjected and in this manner providing a further seal against leakage. The pressure of the lubricant in the chamber 10 may be regulated in accordance with the pressure working against the joint 5.

It will be clearly seen that the flexible joint 5 may be used for any purpose wherein a leak proof joint is required. However, the joint 5 was particularly constructed for use in connection with deep sea diving suits where it provides a flexible joint for such parts of the suit as the elbows, knees, ankles, neck and any other portions of the suit that require a flexible joint for use under the conditions of high external pressure met at the depths at which diving suits are used.

With respect to the foregoing use it will be seen that it is extremely desirable to provide some means for preventing dirt and grit that is in the water from entering or coming in contact with the joint and causing wear in the various parts. The means provided for this purpose consists of a tubular sleeve 41 of rubber or other flexible impervious material. The opposite ends of the sleeve 41 have formed on the inner periphery thereof a plurality of spaced apart annular grooves 42, which are adapted to engage a plurality of similarly spaced annular ridges 43 formed on each of the tubes 8 and 12 as clearly shown in Fig. 1.

In order to prevent the extremely high water pressure encountered in deep sea diving from collapsing the impervious flexible tubular sleeve 41, it becomes necessary to provide means whereby the pressure within the tubular sleeve may be equalized with the water pressure on the exterior of said sleeve. Said means comprises an air conduit 46 which extends through one of the tubes 8 or 12 adjacent the inside periphery and communicates by means of a suitable fitting 47 with the interior of the flexible tubular sleeve 41. The free end of the conduit 46 may be connected to an air hose which will extend above the surface of the water and connect with a suitable air pump. In this manner compressed air may be pumped through the conduit 46 into the tubular sleeve 41 at a sufficient pressure to equalize with the exterior water pressure, and in this way preventing the sleeve from collapsing and interfering with the efficient operation of the joint.

It will now be noted that the disclosed arrangement of parts is such that the joint ball 13 is arranged to be primarily held in place by reason of the action of the lines of ball-bearings 32 at opposite sides of a diametrical plane through said ball, said plane being parallel to the planes of the rings 18 and 19. Thus, assuming an inward thrusting of the ball toward the socket 9, as would naturally occur when the joint is in use in a diving suit under water, the bearing balls 26 between the aforesaid plane and the socket, and nearest the bearing ring 18, would act against the ball 13 to resist a displacement of the latter, and if the thrust were great enough, a frictional condition would be set up which would preclude a ready flexing of the joint while such thrust obtained. It is therefore desirable to counteract the effect of said thrust for insuring a truly flexible joint at all times, and this is accomplished primarily by effecting and maintaining a pressure delivery of the lubricant fluid in the groove 28 of the bearing ring 18 such that an hydraulic pressure is created against the ball joint for urging it toward its normal centered position, said thrust being taken on the ring of liquid between the ball and the ring 18. In a diving suit where external pressures vary at different working depths, the unit pressure maintained in the lubricant delivered to the appropriate groove 28 would, of course, be varied to meet the actual conditions, and insure a freely flexible joint. Should conditions urge a separation of the joint, as when the joint is used in a pressure pipe for liquid, the required centering balance would be similarly effected from the ring 19 at the other side of the aforesaid ball plane and in similar manner to that described. It is to be noted that when a balancing pressure is operative in the fluid groove 28 of the ring 18, the pressure in the groove 28 of the ring 19 need be, and is desirably, only sufficient to effect a sealing of the space between the ring and ball, and vice versa.

From the foregoing it is thought that the construction, use and many advantages of the herein described flexible joint will be readily understood without further description and it will also be understood that changes in the form proportion and minor details of construction may be resorted to without departing from the spirit of the invention or sacrificing any of the advantages thereof.

I claim:

1. A flexible joint comprising a tube provided with a flanged end defining an annular chamber, a second tube formed with a ball shaped end adapted to be received in said flanged end, and axially spaced bearing and sealing rings of non-compressible material fitted within said chamber, the inner peripheral faces of which are oppositely beveled so as to seat against the surface of said ball shaped end at opposite sides of a diametrical plane therethrough.

2. A flexible joint comprising a tube provided with a flanged end defining a chamber, a second tube formed with a ball shaped end adapted to be received in said flanged end, a spherically curved seat for said ball formed in said flanged end, a cap threaded to said flange, sealing rings fitted within said chamber and having beveled inner peripheral faces which seat against said ball so as to be held against inward displacement, said rings being formed with annular grooves in said beveled faces, and means whereby a lubricant under pressure may be forced into said grooves.

3. A flexible joint comprising a tube provided with a flanged end including an annular shoulder and defining a chamber, a second tube formed with a ball shaped end adapted to be received in said flanged end, a cap threaded to said flange and provided with an annular inwardly projecting shoulder, a spherically curved seat for said ball formed in said flanged end, sealing rings fitted within said chamber to lie against the inner faces of said shoulders, the inner peripheral faces of said sealing rings being beveled so as to seat against the surface of said ball and be held against inward displacement, ring bearings fitted within said chamber and positioned between said sealing rings.

4. A flexible joint comprising a tube provided with a flanged end including an annular shoulder and defining a chamber, a second tube formed with a ball shaped end adapted to be received in said flanged end, a cap threaded to said flange and provided with an annular inwardly projecting shoulder, a seat for said ball formed in said flanged end, sealing rings fitted within said chamber to lie against the inner faces of said shoulders, the inner peripheral faces of said sealing rings being beveled so as to seat against the surface of said ball and be held against inward displacement, said rings being provided with annular grooves in said beveled faces, bearing rings fitted within said chamber and positioned between said sealing rings, and bearings carried by said rings so as to ride upon the surface of said ball.

5. A flexible joint comprising a tube provided with a flanged end defining an inwardly opening annular chamber having annular shoulders at opposite ends thereof, a second tube formed with a ball shaped end adapted to be received in said flanged end, sealing rings fitted within said chamber to lie against the relatively opposed faces of said shoulders, the inner peripheral faces of said sealing rings being beveled so as to seat against the surface of said ball, said rings being provided with annular grooves in said beveled faces, bearing rings fitted within said chamber and positioned between said sealing rings, bearings carried by said rings so as to ride upon the surface of said ball, and means communicating with said annular grooves and with said chamber whereby a lubricant under pressure may be forced into said grooves and chamber.

6. A flexible joint comprising a tube provided with a flanged end defining an inwardly opening annular chamber, a second tube formed with a ball shaped end adapted to be received in said flanged end, sealing rings fitted within said chamber and having bevelled inner peripheral faces which seat against said ball so as to be held against inward displacement, said rings being formed with annular grooves in said bevelled faces, and means whereby a lubricant fluid may be forced into said grooves under pressure.

7. A flexible joint comprising a tubular element provided with a flanged end defining an inwardly opening annular chamber, a second tubular element formed with a ball shaped end adapted to be received in said flanged end to have a diametrical plane thereof perpendicular to the axis of said chamber when said tubular elements are coaxially related and intermediately dividing the chamber, a sealing ring fixed in said chamber and transversely spaced from said plane and having a bevelled inner peripheral face closely opposing the ball face and provided with an annular groove, bearing means mounted within said chamber and riding on the surface of said ball in a line between said plane of the ball and said ring, and means communicating with said groove whereby a lubricant may be forced thereinto under pressure.

8. A structure in accordance with claim 7 and characterized by the added provision of means independent of the first mentioned means whereby a lubricant may be forced into and retained in the chamber under pressure.

9. In a flexible joint of the character described and for use under varying external pressure conditions, tubular elements providing a ball and socket connection at their jointure, means sealing said jointure against the passage of fluid therethrough, a sleeve member of flexible material fixed to said elements and sealedly enclosing the joint, and means to introduce a fluid under pressure into the space of said sleeve member external to the joint for equalizing the pressures within said space and externally of the sleeve.

10. In a flexible joint of the character described and for use under varying external pressure conditions, tubular elements cooperative to provide a sealed and flexible jointure, a sleeve member of flexible material fixed to said elements and sealedly enclosing the joint, and means providing an inlet passage to the sleeve space external to said joint and from within a said tubular element whereby to permit the introduction of a fluid under pressure into said space for equalizing the pressure within said space with that external of the sleeve.

11. A flexible joint comprising a tube having an end provided with an inwardly opening annular chamber, a second tube formed with a ball shaped end adapted to be received in said first tube end, sealing rings fitted within said chamber and having inner peripheral faces for seating against said ball at opposite sides of a diametrical plane thereof, said rings being formed with annular grooves in said inner faces thereof, and means whereby a lubricant fluid may be forced into a said groove under pressure and for coaction with the ball to urge an unseating of the ring providing the groove.

In testimony whereof I affix my signature.

JOHN C. WILLIAMS.